J. RIISE.
WHEEL HUB.
APPLICATION FILED AUG. 17, 1917.
1,301,506.
Patented Apr. 22, 1919.
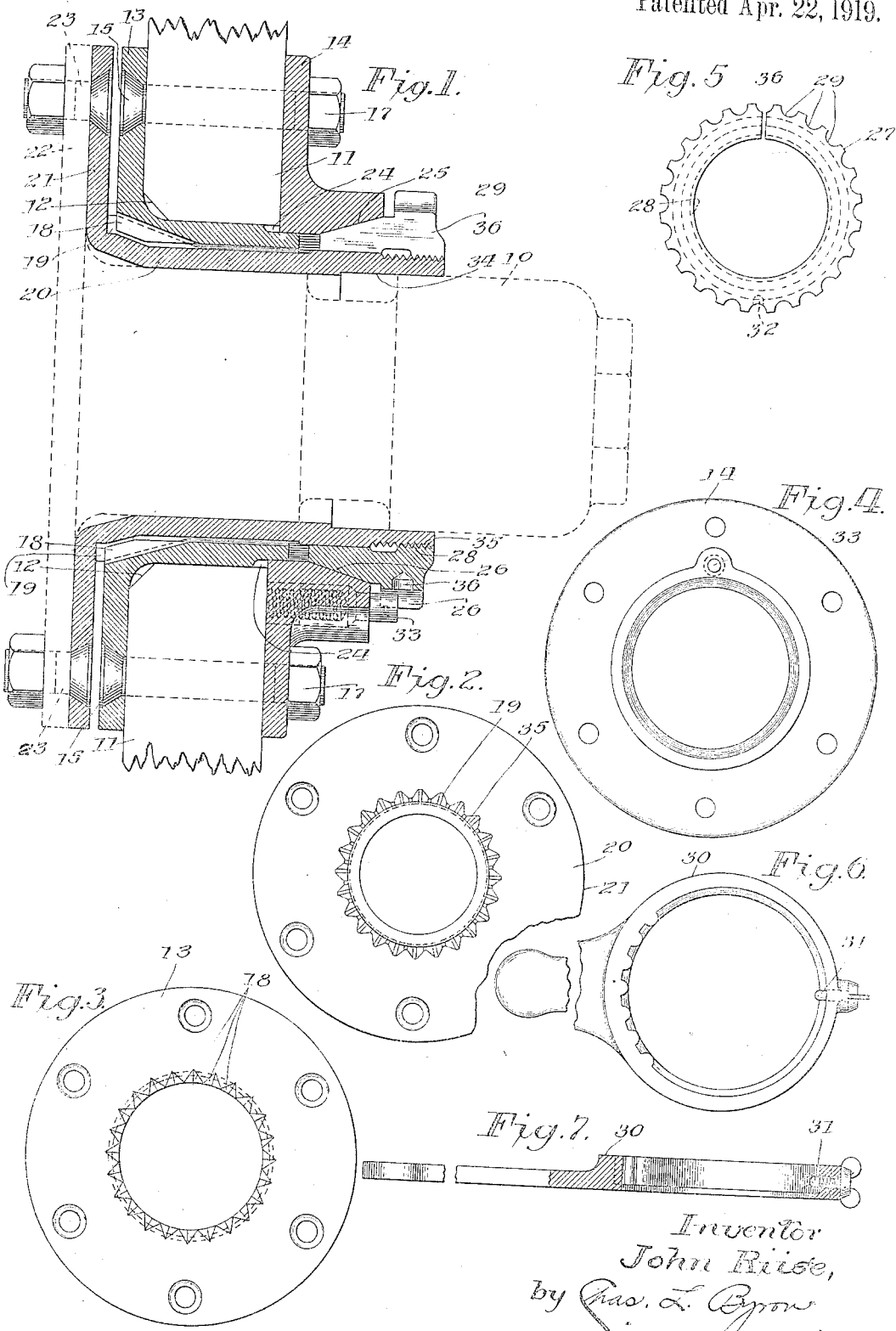

UNITED STATES PATENT OFFICE.

JOHN RIISE, OF CHICAGO, ILLINOIS.

WHEEL-HUB.

1,301,506.                    Specification of Letters Patent.    Patented Apr. 22, 1919.

Application filed August 17, 1917. Serial No. 186,987.

*To all whom it may concern:*

Be it known that I, JOHN RIISE, a subject of the King of Norway, residing at Chicago, in the county of Cook and State of Illinois, have invented certain new and useful Improvements in Wheel-Hubs, of which the following is a full, clear, and exact specification.

This invention relates to wheel hubs, and more particularly to wheel hubs for detachable wheels, finding application principally, although not necessarily exclusively, in connection with motor vehicles.

The many advantages in having wheels with quick detachable hubs are becoming more apparent every day, and, as a matter of fact, this luxury has become substantially a necessity in connection with motor vehicles. An automobile driver finds a quick detachable wheel of particular advantage when one of the tires has been punctured or exploded. In case he has an extra wheel equipped with a tire and has the detachable hub arrangement, it is merely necessary for him to detach the injured wheel and attach the emergency wheel without bothering with the repair of the injured tire. Again, detachable wheels may be interchanged from the rear to the front, and vice versa.

Most of the higher priced cars have quick detachable wheels. However, some of the relatively inexpensive cars, such, for instance, as the Ford, do not have quick detachable wheels, and, as a matter of fact, the front and rear wheels of such cars cannot be interchanged.

One object of my invention is to provide an arrangement whereby wheels used on the Ford cars may be made quick detachable and interchangeable.

Another object of the invention is to simplify and improve detachable wheel hubs.

Another object is to improve means for locking the portions of the hub against accidental separation.

A further object is to provide a hub for detachable wheels adapted to meet all the requirements for successful commercial operation.

These and other objects are accomplished by providing a wheel hub having inner and outer members with interlockable portions and novel means for causing an interlocking relation between said members and locking them in such relationship in a manner to prevent accidental separation of said members.

The invention is illustrated on the accompanying sheet of drawings, in which—

Figure 1 is a sectional view of my improved wheel hub;

Fig. 2 is a reduced end view of the inner hub member withdrawn from its mating member, showing its externally and circumferentially arranged serrations;

Fig. 3 is a reduced end view of the outer removable hub member having corresponding serrations which mate with those on the member shown in Fig. 2;

Fig. 4 is a reduced end view of the third flange member which coöperates with the member shown in Fig. 3, and with the member shown in Fig. 3 is secured to the inner ends of the spokes of the wheel;

Fig. 5 is a combination nut which acts not only as a nut, but also as a wedge and as a locking member;

Fig. 6 is a fragmentary plan view of a wrench which is used in connection with the nut shown in Fig. 5; and, Fig. 7 is a fragmentary sectional view of the same wrench.

The various novel features of my invention will be apparent from the following description and drawings and will be particularly pointed out in the appended claims.

My present invention finds particular application in connection with Ford wheels, but not necessarily limited thereto. In Fig. 1 I have shown in dotted lines a Ford hub 10. The inner ends of the spokes 11 of the wheel have been bored out an increased amount and chamfered at 12, and bolted between two flange members 13 and 14, the bolts 15 passing through openings in the flange members 13 and 14 and inner ends of the spokes 11 and secured in position by suitable nuts 17. The flange member 13 is provided with internally and circumferentially arranged serrations 18, mating with externally and circumferentially arranged serrations 19 formed on an inner hub member 20 having a flange 21 which may be secured to the flange 22 of the regular Ford hub by suitable bolts 23. The outer hub member 13 has formed thereon an annular groove 24 for the reception of the flange member 14. In other words, the flange member 14 is centered on the outer hub member 13. This flange member 14 is provided with an internal beveled surface 25 for the reception of the wedge-shaped portion 26 of a nut 27 having an internal thread 28 which engages the outer external threaded portion 35 of the inner hub member. This nut is provided with circumferentially arranged notches 29 for the reception of a wrench 30, the latter of which has an adjustable stud 31 which may be received in a socket 32 in the nut 27. The flange member 14 is also provided with a spring-pressed plunger 33 which normally engages any one of the notches 29 in the nut to assist in locking the nut in any adjusted position.

It will be noted that the ordinary wheel may be changed into a demountable wheel by first increasing the bore through the inner ends of the spokes and then providing but three flange members and a nut which I have shown and described herein. It will be noted that the inner flange member is secured to the Ford hub member 22 by means of bolts 23. The wheel proper, the spokes of which are clamped between the flange members 13 and 14, is then applied in a manner such that the serrated portions of the inner and outer hub members are placed in mesh. Then the nut 27 is screwed onto the outer threaded portion of the inner hub member, whereupon the wedge 26 of the nut presses against the beveled portion 25 of the flange member 14 to positively center the outer hub member with respect to the inner hub member and to hold the same thereon by a wedging action. This wedging action is greatly increased due to the fact that the nut is split in two, as shown at 36, forming in effect a split ring. The wedging action, therefore, caused by this split ring or nut, is uniform throughout the whole engaging surface of the nut and beveled portion of the member 14 and the coöperating annular portion 34 of the inner hub member. As stated before, the wrench 30 may be employed for tightening the nut. It will be noted that when the wrench 30 is applied, the spring-pressed plunger 33 will be forced out of engagement with the notches in the periphery of the nut so that the nut may be turned to any desired degree. As soon as the wrench is withdrawn, however, the spring-pressed plunger 33 will snap into engagement with one of the notches to assist in holding the nut in its adjusted position.

In order to quickly detach a wheel equipped with my hub members, it is merely necessary to withdraw the nut 27 and then the outer hub member 13 with its associated parts, whereupon another wheel may be quickly applied to the inner hub member to meet any emergency.

It will be noted that the split nut 27 not only acts as a nut, but by means of its laterally extending external wedge portion 26 and the through split 36 an effective wedge locking action is obtained, and in addition the notched periphery of the nut also forms one element of a positive lock to prevent accidental removal of the wheel.

It is apparent that there may be modifications of the arrangement herein particularly shown and described, and it is my intention to cover all such modifications which do not involve a departure from the spirit and scope of my invention as set forth in the following claims.

What I claim as new is:

1. In a hub for detachable wheels, the combination of inner and outer hub members having interlocking portions, a flange member connected to the outer hub member and having a beveled portion, a nut having wrench notches and engaging the inner hub member and having a wedge portion engaging the beveled portion of the flange member to hold the inner and outer hub members in interlocking engagement, and a spring pressed pin mounted in said flange member and engageable with a wrench notch in said nut to positively lock the nut against accidental movement.

2. In a hub for detachable wheels, the combination of inner and outer hub members having interlocking portions, a flange member centered on the outer hub member and having a beveled portion, a notched nut split throughout its length engaging the inner hub member and having a wedge portion engaging the beveled portion of the flange member whereby the inner and outer hub members may be wedged into interlocking engagement, and a plunger mounted in said flange member for normally engaging a notch in said nut to prevent accidental movement of said nut.

3. In a hub for detachable wheels, the combination of inner and outer hub members having interlocking portions, said inner hub member having a smooth portion and a threaded portion, a flange member centered on the outer hub member and having a beveled portion, a notched nut split throughout its length and threaded onto the threaded portion of said inner hub member and having a wedge portion engaging the smooth portion of said inner hub member and engaging the beveled portion of the flange member whereby the inner and outer hub members may be wedged into interlocking engagement, and a plunger mounted in said flanged member for normally engaging a notch in said nut to prevent accidental movement of said nut.

JOHN RIISE.